United States Patent [19]

Lal et al.

[11] 4,272,436
[45] Jun. 9, 1981

[54] COMPOSITION AND METHOD OF IMPROVING THE GREEN STRENGTH OF UNVULCANIZED RECLAIMED RUBBER

[75] Inventors: Joginder Lal, Akron; Sandra J. Walters, Stow, both of Ohio

[73] Assignee: The Goodyear Tire & Rubber Company, Akron, Ohio

[21] Appl. No.: 42,190

[22] Filed: May 24, 1979

Related U.S. Application Data

[62] Division of Ser. No. 779,382, Mar. 21, 1977, Pat. No. 4,198,324.

[51] Int. Cl.$^3$ .................. C08J 11/04; C08L 45/00
[52] U.S. Cl. ................................ 260/2.3; 525/216
[58] Field of Search .................... 260/2.3; 525/216

[56] References Cited
U.S. PATENT DOCUMENTS 3,477,968  11/1969  Massoubre ..................... 260/2.3

Primary Examiner—J. Ziegler
Attorney, Agent, or Firm—Daniel J. Hudak; J. Y. Clowney

[57] ABSTRACT

The green strength of elastomers is improved by the addition of semi-crystalline butene polymers selected from the class consisting of polybutene and interpolymers made from 1-butene monomer and at least one monomer selected from the class consisting of alpha-olefins, non-conjugated dienes, and non-conjugated polyenes. The semi-crystalline butene polymer is mixed with a desired elastomer such as natural or synthetic cis-1,4-polyisoprene, or a synthetic elastomer made from monomers selected from the class consisting of conjugated dienes having from 4 to 10 carbon atoms, interpolymers of said dienes among themselves or with vinyl substituted aromatic hydrocarbon compounds having from 8 to 12 carbon atoms, or polyalkenylenes. The mixing or blending of the butene polymer and the elastomer may be through conventional methods such as cement mixing or mastication.

2 Claims, No Drawings

COMPOSITION AND METHOD OF IMPROVING THE GREEN STRENGTH OF UNVULCANIZED RECLAIMED RUBBER

CROSS REFERENCE

This application is a divisional application of my copending application, U.S. Ser. No. 779,382 filed on Mar. 21, 1977, U.S. Pat. No. 4,198,324, for "COMPOSITION AND METHOD OF IMPROVED GREEN STRENGTH AND UNVULCANIZED ELASTOMERS."

BACKGROUND OF THE INVENTION

The present invention relates to improved green strength of unvulcanized elastomers. More specifically, the present invention relates to the improvement of green strength by adding semi-crystalline butene polymers to elastomers. Science and technology in the elastomer field have improved to such an extent that synthetic elastomers have supplemented or replaced natural rubber to a great extent in the fabrication of tires and other rubber products. Stereo-regular polymers and particularly synthetic high cis-1,4-polyisoprene have demonstrated physical properties similar to natural rubber and thus are capable of becoming a complete replacement for it. A major deficiency of many synthetic elastomers including cis-1,4-polyisoprene is their lack of sufficient green strength required for satisfactory fabrication of tires and industrial goods. The abatement of this deficiency has long been sought by the art and would greatly facilitate in the replacement of natural rubber which is solely produced in tropical climates.

The term "green strength" while being commonly employed and generally understood by persons skilled in the rubber industry, is nevertheless a difficult property to precisely define. Basically, it is that property of a polymer, common in natural rubber, which contributes the proper building characteristics where multiple components are employed and which result in little or no relative movement of the assembled components subsequent to assembly and prior to initiation of the curing operation. "Tack" is also an important property but the lack of tack is usually readily overcome by the addition of well known and conventional tackifying agents. Thus, green strength, that is adequate mechanical strength for fabricating operations necessarily carried out prior to vulcanization with synthetic homopolymers or interpolymers, is lacking. That is, generally the maximum or "yield" stress which the unvulcanized compositions will exhibit during deformation is rather low and moreover, the stress drops off quite rapidly as the deformation continues. Thus, unvulcanized strips or other forms of the elastomer often pull apart in a taffylike manner during building operations. Although numerous additives and compounds have been utilized in association with various elastomers and particularly synthetic cis-1,4-polyisoprene, adequate improvement in green strength has generally not been accomplished.

Green strength has generally been measured by stress/strain curves of unvulcanized compounds. Usually, the performance of a green compound is based upon two points of the stress/strain curve, namely the first peak or yield point and the ultimate or breaking tensile. Improvement in either of these stress properties indicates improved green strength.

Among the various additive compounds or agents which have been utilized to improve green strength of synthetic elastomers are numerous nitroso compounds as set forth in U.S. Pat. Nos. 2,457,331; 2,447,015; 2,518,576; 2,526,504; 2,540,596; 2,690,780; and 3,093,614. Additionally, various dioxime compounds have been utilized such as those set forth in U.S. Pat. Nos. 2,969,341; 3,037,954; 3,160,595; and British Pat. No. 896,309. Yet another class of additives or compounds is the diesters of 5-norbornene as set forth in U.S. Pat. Nos. 3,817,883 and 3,843,613.

A Romanian article was published in *Materiale Plastice* No. 10 (11), 604–607 (1973) entitled "INFLUENCE OF ADDITIONS OF POLYBUTYLENE WITH DIFFERENT MOLECULAR WEIGHT ON THE PROPERTIES OF COMPOSITIONS OF CIS-POLYISOPRENE SYNTHETIC RUBBER" and prepared by B. Mehr and T. Volintiru. This article discloses the use of polybutylene which is mixed with synthetic or natural rubber to give increases in various properties. As set forth on Page 2 of the translation of the article, the molecular weight must be low and cannot exceed 10,000 since otherwise a mixture with a synthetic rubber cannot be obtained. The article does set forth data which shows that various physical properties are improved such as the increase in resistance to repeated bending and increased ozone resistance. However, as plainly evident by the table set forth on Page 3 of the translation, no appreciable increase in tensile or rupture strength is obtained when polybutylene is utilized. In fact, the bottom of Page 3 of the translation clearly states that in comparison with low pressure polyethylene utilized as a mixture, the polybutylenes do not improve the green strength of cis-polyisoprene synthetic rubber. Thus, this article is not pertinent.

Another U.S. Patent, namely U.S. Pat. No. 3,909,463 assigned to Allied Chemical Corporation, relates to the preparation of graft copolymers wherein a synthetic rubber is grafted onto an olefin polymer backbone such as polypropylene and polybutylene whereby composition is formed which is free of substantial amounts of cross-linked rubber. The amount of olefin polymer utilized is from 40 percent to about 99 percent by weight. Additionally, a bifunctional phenol-aldehyde condensate is utilized in forming the graft copolymer. The grafted copolymer formed appears to be a high impact resin.

The present application is readily distinguished from the above reference in that a physical blend is formed as opposed to a chemical reaction for forming a graft copolymer, a rubber compound is formed as opposed to a high impact resin, low amounts of polybutylene are utilized in comparison to the high amount contained in the graft copolymer and no bifunctional phenol-aldehyde condensate is utilized whatsoever in the present invention.

SUMMARY OF THE INVENTION

It is therefore an object of the present invention to provide elastomers having improved green strength.

It is another object of the present invention to provide improved green strength elastomers, as above, which contain a semi-crystalline butene polymer.

It is still another object of the present invention to provide improved green strength elastomers, as above, where the elastomers are natural or synthetic cis-1,4-polyisoprene, or synthetic elastomers made from monomers selected from the class consisting of conjugated dienes having from 4 to 10 carbon atoms, or interpolymers of said conjugated dienes among themselves or with monomers selected from the group consisting of vinyl substituted aromatic hydrocarbon compounds having from 8 to 12 carbon atoms, or polyalkylenes.

It is a further object of the present invention to provide improved green strength elastomers, as above, where the elastomers are common rubbers such as natural or synthetic cis-1,4-polyisoprene, cis-1,4-polybutadiene, solution or emulsion SBR (styrene/butadiene rubber), poly(2,3-dimethylbutadiene), polypiperylene, 3,4-polyisoprene, 1,2-polybutadiene, interpolymers of dienes such as copolymers of isoprene and butadiene, copolymers of 2,3-dimethylbutadiene and piperylene, and polymers obtained by the ring opening of cycloolefins.

It is still another object of the present invention to provide improved green strength elastomers, as above, wherein the elastomers include reclaimed rubber.

It is still a further object of the present invention to provide improved green strength elastomers, as above, wherein the butene polymer is a reasonably high molecular weight polymer selected from the class consisting of a homopolymer of 1-butene, and interpolymers made from 1-butene monomer with at least one monomer selected from the class consisting of alpha-olefins having from 2 to 16 carbon atoms, non-conjugated dienes of the general formula:

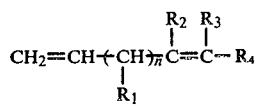

where $R_1$, $R_2$ and $R_3$ is a hydrogen, a lower alkyl group containing up to four carbon atoms, or an aryl group, $R_4$ is an aryl group or a lower alkyl group containing up to nine carbon atoms and n is an integer having values of from 1 through 6, and wherein the said $R_1$'s in the

may be similar or dissimilar, and non-conjugated alpha, omega-polyenes having from 6 to 36 carbon atoms which may or may not contain internal unsaturation, wherein butene in the interpolymers comprises from 99.9 to 65 mole percent of the total monomers charged.

These and other objects of the present invention will become apparent from the following specification which describes in detail the embodiments without attempting to discuss all of the modifications in which the invention might be embodied.

In general, a process for producing elastomer blends having improved green strength comprises a butene polymer with an elastomer, said butene polymer is defined as a reasonably high molecular weight polymer selected from the class consisting of polybutene and interpolymers made from 1-butene monomer and at least one monomer selected from the class consisting of alpha-olefins having 2 through 16 carbon atoms, non-conjugated dienes having the general formula:

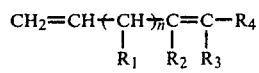

where $R_1$, $R_2$, and $R_3$ is a hydrogen, a lower alkyl group containing from one to four carbon atoms, or an aryl group; where $R_4$ is an aryl group or a lower alkyl group containing from one to nine carbon atoms, and n is an integer having a value of from 1 to 6, and wherein the said $R_1$'s in the

group may be similar or dissimilar; and non-conjugated alpha, omegapolyenes having from 6 to 36 carbon atoms which may or may not contain internal unsaturation, wherein butene in said interpolymers comprises from 99.9 to 65 mole percent of the total monomers; said elastomer selected from the group consisting of natural cis-1,4-polyisoprene, synthetic cis-1,4-polyisoprene, and synthetic elastomers; said synthetic elastomers made from monomers selected from the group consisting of conjugated dienes having from 4 to 10 carbon atoms, interpolymers of said conjugated dienes among themselves or with monomers of vinyl substituted aromatic hydrocarbons having from 8 to 12 carbon atoms, and polyalkenylenes.

In general, an elastomer composition having improved green strength comprises a semi-crystalline butene polymer of reasonably high molecular weight existing in a blend with an elastomer wherein said butene polymer and said elastomer are set forth herein immediately above.

DESCRIPTION OF THE PREFERRED EMBODIMENTS

According to the concepts of the present invention, improved green strength of elastomers is obtained through the addition of semi-crystalline butene polymers. The method of addition of the butene copolymers to the elastomers may be any conventional method such as blending the polymer with the desired synthetic rubber(s) in a cement phase followed by solvent removal or by the addition of the desired amount of polymer to the synthetic rubber during compounding. Of course, any other blending or mixing method may be utilized since the only requirement is that the butene polymer of the present invention be dispersed within the elastomer.

The mechanism of green strength improvement of the elastomers with butene polymers is not established. Presumably, the butene polymers improve the green strength by providing sites of crystallinity in the blend. In general, the crystalline polymers for imparting green strength improvement possess a certain desirable melting temperature. If the melting temperature is too high, it will not blend easily with the elastomer composition. A desirable melting temperature of the butene polymers of the present invention is generally from about 55° C. to about 125° C. with a preferred range being from about 70° C. to about 100° C. For this reason, the homopolymer of propylene is not suitable.

The crystalline butene polymers are obtained by polymerizing 1-butene alone to form polybutene or by forming interpolymers from 1-butene monomer and at least one monomer selected from the class consisting of alpha-olefins having 2 through 16 carbon atoms, non-conjugated dienes having the general formula:

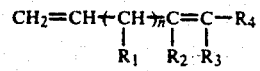

where $R_1$, $R_2$, and $R_3$ is a hydrogen, a lower alkyl group containing from one to four carbon atoms, or an aryl group; where $R_4$ is an aryl group or a lower alkyl group containing from 1 to 9 carbon atoms, and n is an integer having a value of from 1 to 6, and wherein the said $R_1$'s is in the

group may be similar or dissimilar; and non-conjugated alpha, omegapolyenes having from 6 to 36 carbon atoms which may or may not contain internal unsaturation. The butene interpolymers contain from 99.9 to 65 mole percent, and preferably from 95 to 70 percent of butene.

Examples of suitable alpha-olefins which can be utilized for copolymerization with 1-butene include ethylene, propylene, 1-pentene, 1-hexene, 1-heptene, 4-methyl-1-pentene, 4-methyl-1-hexene, 5-methyl-1-hexene, 1-octene, 1-nonene, 1-decene, 1-undecene, 1-dodecene, 1-hexadecene. The linear monoolefins are preferred, with ethylene, propylene, 1-hexene and 1-octene being highly preferred.

Specific examples of suitable dienes of the general formula:

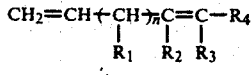

include cis-1,4-hexadiene, trans-1,4-hexadiene, cis-1,4-heptadiene, trans-1,4-heptadiene, 4-methyl-1,4-hexadiene, 4-ethyl-1,4-hexadiene, 4-butyl-1,4-hexadiene, 3-methyl-1,4-hexadiene, 4-methyl-1,4-heptadiene, 4-methyl-1,4-nonadiene, 3,4-dimethyl-1,4-hexadiene, cis-1,4-nonadiene, trans-1,4-nonadiene, 6-phenyl-1,4-hexadiene, 5-phenyl-1,4-hexadiene, 5-p-tolyl-1,4-hexadiene, 4,5-diphenyl-1,4-hexadiene, cis-1,4-octadiene, trans-1,4-octadiene, trans-1,4-decadiene, trans-1,4-dodecadiene, cis-1,4-dodecadiene, trans-1,4-tetradecadiene, cis-1,4-tetradecadiene, 1,5-heptadiene, 1,6-octadiene, and 7-methyl-1,6-octadiene.

Preferred dienes include trans-1,4-hexadiene, trans-1,4-heptadiene, and 5-methyl-1,4-hexadiene.

Specific examples of suitable alpha, omega-polyenes which may be utilized to form butene interpolymers include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, 1,4,9-decatriene, 1,5,9-decatriene, 1,6,9-decatriene, 1,5,9,13,17-octadecapentadiene, 1,9,17-octadecatriene, 1,4,7-octatriene, and the like. Preferred alpha, omega-polyenes are 1,7-octadiene, 1,9-decadiene and 1,5,9-decatriene.

As employed in this specification, inherent viscosity is defined as the natural logarithm of the relative viscosity at 30° C. divided by the polymer concentration for a 0.05 to 0.25 percent (W./V.) solution in toluene, chloroform, tetrachlorethylene or other suitable solvent and expressed in units of deciliters per gram (dl./g.). The butene polymers of the present invention have an inherent viscosity of from about 0.5 to about 10.0 dl./g. and preferably from about 1.0 to about 4.0 dl./g.

Coordination catalysts prepared from organometallic-transition metal compounds may be utilized in the present invention in the preparation of the butene polymers. These catalysts are well known to the art and do not constitute a part of this invention. Examples of such catalyst systems include triethylaluminum-vanadium tetrachloride, triethylaluminum-α-titanium trichloride, diethylaluminum chloride-α-titanium trichloride, and triethylaluminum-titanium tetrachloride. Of course, many other catalysts may be utilized.

Generally, the butene polymer is blended with various known elastomers. The various elastomers include natural or synthetic cis-1,4-polyisoprene, or synthetic elastomers made from monomers selected from the group consisting of conjugated dienes having from 4 to 10 carbon atoms, or interpolymers of said dienes among themselves or with monomers selected from the group consisting of vinyl substituted aromatic hydrocarbon compounds having from 8 to 12 carbon atoms, or with polyalkenylenes. Specific examples of suitable elastomers include natural cis-1,4-polyisoprene rubber such as guayule and hevea, synthetic cis-1,4-polyisoprene, cis-1,4-polybutadiene, solution or emulsion styrene/butadiene rubber, polypiperylene, poly(2,3-dimethylbutadiene),3,4-polyisoprene, 1,2-polybutadiene, and the like. The terms cis-1,4-polyisoprene and cis-1,4-polybutadiene imply that these rubbers contain about 70 percent or more of the cis-1,4-structure. The term 3,4-polyisoprene, as used here, implies about 30 percent or more of the 3,4-structure. Likewise, 1,2-polybutadiene denotes about 30 percent or more of the 1,2-structure. Examples of specific interpolymers made from the conjugated dienes include interpolymers of isoprene and butadiene, isoprene and piperylene, 2,3-dimethylbutadiene and piperylene, and the like. The elastomeric interpolymers of the conjugated dienes with the vinyl substituted aromatic compounds will contain from about 2 percent to about 50 percent by weight of the vinyl compound with a desired range being from 5 percent to about 35 percent. A preferred range is from about 15 percent to about 20 percent. Examples of suitable vinyl-substituted aromatic compounds include styrene, alpha-methylstyrene, ortho-, para-, and meta-methyl and ethyl styrenes, and the like. Styrene and alpha-methylstyrene are preferred. Hence, examples of such interpolymers will include those prepared from styrene and butadiene, styrene and isoprene, alpha-methylstyrene and butadiene, and the like.

Polyalkylenes, according to the present invention, mean homopolymers of cyclomonoolefins, homopolymers of nonconjugated cyclopolyolefins, and interpolymers of cyclomonoolefins with non-conjugated cyclopolyolefins. Typical examples of polyalkylenes are polypentenylene which is a homopolymer of cyclopentene having from about 5 to 99 percent cis and 95 to 1 percent trans configurations of double bonds; polyoctenylene which is a homopolymer of cyclooctene having about 25 to 95 percent cis and 75 to 5 percent trans configurations of double bonds, polyoctadieneylene which is a homopolymer of 1,5-cyclooctadiene having about 25 to 85 percent cis and 75 to 15 percent trans configurations of double bonds; copolymers of cyclopentene and dicyclopentadiene containing 10 to 40 mole percent dicyclopentadiene; and copolymers of cyclooctene and 1,5-cyclooctadiene containing 10 to 50 mole percent cyclooctadiene.

Generally the preferred elastomers for practicing the present invention include natural or synthetic cis-1,4-polyisoprene, cis-1,4-polybutadiene, 1,2-polybutadiene, and the copolymer of styrene and butadiene.

Generally, an amount of synthetic (or natural) rubber is utilized so that the range of the butene polymers is from about 2 to about 25 parts by weight per 100 parts of elastomer. A preferred range is from about 3 to about 12 parts per 100 of elastomer. The number average molecular weight of the synthetic rubber may desirably range from about 100,000 to about 500,000 with a more desirable range being from about 150,000 to about 300,000. The number average molecular weight of the butene polymers may desirably range from about 30,000 to about 500,000, with a more desirable range being from about 50,000 to about 300,000.

The butene polymers of the present invention which are added to the natural or synthetic rubbers can also be utilized to improve the green strength of reclaimed rubber. Reclaimed rubber may be defined as the product resulting from the treatment of ground scrap rubber by the application of mechanical operations, heat and chemical agents, whereby a substantial regeneration of the rubber compound to its original plastic state is effected, thus permitting the product to be processed, compounded, and vulcanized. The composition of the reclaimed rubber, of course, will vary according to the source or items reclaimed and thus can vary from batch to batch and also due to the reclaiming technique utilized. Generally, along with the reclaimed rubber and the butene polymers, an amount of at least 5 percent by weight of synthetic or natural rubber is also added. The amount of butene polymers to the total weight of the blend is the same as before, that is, from 2 to 25 weight percent.

Regardless of whether synthetic rubbers and/or reclaimed rubber is utilized, the butene polymers may be dispersed into the elastomer according to conventional methods. One such method relates to blending a suitable butene polymer of the present invention with the desired elastomer in a cement phase followed by solvent removal. The cement mix may be obtained either by mixing together separately prepared components or by dissolving components together in the presence of a suitable solvent. Of course, the solutions of blend components may also be obtained by solution polymerization. The second method, according to current practice, involves the addition of the desired amount of butene polymer to the elastomer, thus forming the blend during mastication as in an internal mixer or an open mill. Preferably, the butene polymer must at some point be melted and mixed with the elastomer so that crystallizable sites will be dispersed throughout the blend and thereby enhance the improvement in green strength.

Either of the two commonly employed methods, or any other method, may utilize more than one type of elastomer to form the blend. Of course, the blend may also include natural rubber, as noted. Similarly, more than one butene polymer may be utilized, with the total amount of polymer falling within the above-noted ranges.

As previously noted, the blending of the butene polymers results in green strength improvement which is usually retained throughout extended processing, including gum stock as well as filled stocks. The addition of the butene polymers in the amounts set forth above does not adversely effect the gel content, Mooney, or other raw physical properties. Physical properties of the vulcanized blends are at least equivalent to those of the elastomers utilized in the blend. Additionally, the blends show significantly higher green strength even after extensive milling. This latter behavior is particularly desirable for rubber stocks used for the fabrication of complicated articles such as tires and the like. Of course, the blends of the present invention may be used for any heretofore employed purpose such as for tires in either the body or tread portion, belts, hoses, and other industrial uses. A preferred use is for the manufacture of radial tires, especially truck tires.

Typical or usual compounding ingredients may be added to the blends as during mastication or other steps. Thus, carbon black, zinc oxide, silica, various clays, oils, waxes, or fibers may be utilized along with a host of other compounds such as antioxidants, antiozonants, curing agents, accelerators, processing agents, and the like, as well known and understood by those skilled in the art. Conventional equipment can be utilized for blending the butene polymer with the elastomer as well as for the compounding material. Thus, the butene polymer can be dry blended with the elastomer by mixing in a conventional rubber mill or internal mixer, such as a Banbury mixer, either before or during the addition of the desired compounding materials.

The invention will be more fully understood by the following examples:

PREPARATION OF BUTENE POLYMER

The following examples describe the preparation of a copolymer of 1-butene and 1-hexene; 1-hexene (minimum purity of 96 percent) and n-heptane were dried separately by passing through an 18-inch silica gel column. 1-butene (minimum purity of 99 percent) was used directly from a cylinder and bubbled into a known quantity of n-heptane in a 2-necked flask equipped with a dry-ice condenser. The amount of butene dissolved was determined from increase in the weight of the flask. To this solution, an appropriate amount of dried hexene was added so that the molar ratio of butene to hexene was 85:15. The total monomer concentration was adjusted to about 25 weight percent by the addition of more heptane. The entire mixture was carefully sparged with high purity nitrogen.

The polymerization catalyst, $\alpha$-TiCl$_3$/Et$_2$AlCl, was prepared in situ under nitrogen by the addition of a 1.5 molar Et$_2$AlCl solution in heptane followed by 1.16 molar $\alpha$-TiCl$_3$ (contains 0.33 molar AlCl$_3$) suspension in heptane. The molar ratio of Et$_2$AlCl to TiCl$_3$ was about 1.5.

For instance, a solution of 448 grams of 1-butene and 120 grams of hexene in 2,000 ml. heptane was polymerized under nitrogen at 25° C. with catalyst prepared from 6 ml. of 1.16 molar $\alpha$-TiCl$_3$ suspension in heptane and 7.2 ml. of 1.5 molar Et$_2$AlCl solution in heptane. After 120 hours, the polymerized mass was precipitated in excess methanol containing a phenolic antioxidant. The dried copolymer was obtained in 91 percent conversion. Its inherent viscosity was 4.1.

In a similar manner, a solution of 56 grams of butene in 250 ml. of heptane was polymerized with a catalyst prepared from 1.0 ml. of 1.16 molar suspension of $\alpha$-TiCl$_3$ and 1.20 ml. of 1.5 molar Et$_2$AlCl solution in heptane. The polymerization was allowed to procede at room temperature for 72 hours, the contents being shaken. A suspension of polybutene was obtained. After precipitation in excess methanol, a crystalline, white powdery material was obtained in 72 percent conversion by drying in a vacuum oven. It gave endothermic peaks at 98° and 121° C. by differential thermal analysis using a calorimetric attachment.

BLENDING AND COMPOUNDING

Carbon black-loaded synthetic rubber stocks were prepared in an internal mixer in accordance with the following recipe:

| MATERIAL | PARTS BY WEIGHT |
|---|---|
| Elastomer | 100 |
| Butene copolymer | 0 or 3 to 25 |
| HAF black | 25 |
| zinc oxide | 3 |
| stearic acid | 2 |

The black-loaded rubber stocks were milled from between 5 and 30 minutes on a 9 inch open mill, 0.050 inch opening, at 140° to 160° F. in 300 gram batches. For tests involving vulcanizate properties, sulfur and accelerator were added in a second Banbury batch.

Green strength tests were conducted in the following manner. Blend composition either prepared by cement blending or mastication were pressed under 25 tons of pressure in a 12½ inch hydraulic press at 200° F. for 15 minutes into a 0.10 inch thick strip mold. The strips were allowed to cool under the same pressure and held at room temperature for 16 hours. Then the strips were cut into dumbbells having a narrowed cross-section of 0.125 by 0.10 inches. The dumbbells were then pulled at 25° C. on an Instron Tensile Tester at a jaw separation speed of 10 inches per minute. The stress in pounds per square inch was calculated at the yield point (initial tensile peak) and at break. The elongation at break was expressed as percent increase in the original length of the dumbbell between bench marks on the narrowed cross-section.

Data for yield stress, stress-at-break and percent elongation-at-break for carbon black-loaded blends of Natsyn 200 (synthetic cis-1,4-polyisoprene, greater than 95 percent cis content, a trademark of The Goodyear Tire and Rubber Company) are shown in Tables I, II, III and IV. Table V shows the data for the same properties for a 35/35/30 blend of natural rubber/Butene (cis-1,4-polybutadiene, trademark of The Goodyear Tire and Rubber Company)/SBR (84 percent butadiene, 16 percent styrene, extended with 37.5 phr oil). The blends of the materials set forth in Tables I through V were made in a Size B Banbury according to a method set forth above.

TABLE I

Green Strength Comparisons for Black-Loaded Banbury Stocks of Several Rubbers. Blends Shown are with 5 PHR of a 90/10 1-Butene/1-Hexene Copolymer*

| Diene Rubber Type | Milling Time (min) | Control Stocks | | | Blends | | |
|---|---|---|---|---|---|---|---|
| | | Yield Stress (psi) | Break Stress (psi) | (% Elong) | Yield Stress (psi) | Break Stress (psi) | (% Elong) |
| Natsyn 200[1] | 0 | 41 | 97 | (1500) | 100 | 220 | (400) |
| | 5 | 27 | 13 | (2200) | 34 | 34 | (2000) |
| | 10 | 27 | 12 | (2500) | 30 | 20 | (1800) |
| | 30 | 24 | 5 | (2500) | 25 | 11 | (2000) |
| Emulsion SBR[2] | 0 | 50 | 25 | (500) | 69 | 69 | (300) |
| | 5 | 33 | 22 | (750) | 46 | 50 | (300) |
| | 10 | 32 | 18 | (600) | 43 | 34 | (400) |
| | 30 | 31 | 17 | (500) | 41 | 32 | (300) |
| 1,2-PBd[3] | 0 | 30 | 22 | (500) | 66 | 66 | (150) |
| | 5 | 32 | 21 | (300) | 36 | 25 | (300) |
| | 10 | 31 | 21 | (300) | 38 | 28 | (350) |
| | 30 | 30 | 16 | (400) | 37 | 25 | (300) |
| Natural Rubber | 0 | 51 | 285 | (1,000) | 310 | 755 | (580) |
| | 5 | 33 | 73 | (1,000) | 85 | 217 | (570) |
| | 10 | 31 | 70 | (1,200) | 41 | 108 | (880) |
| | 30 | 24 | 29 | (900) | 32 | 75 | (940) |

*Molar charge ratio; polymerization temperature: 30° C.; inherent viscosity, 4.9.
[1]Synthetic cis-1,4-polyisoprene (>96% cis content), commercially available from The Goodyear Tire and Rubber Company.
[2]Styrene/butadiene rubber, 84% butadiene and 16% styrene, with 37.5 parts oil.
[3]Medium vinyl polybutadiene commercially available from ISR, 48%, 1,2-structure. Contained 37.5 parts oil.

As is readily apparent from Table I, the green strength for the three synthetic elastomers as well as natural rubber was greatly increased by blending with 5 phr of a 90/10 butene/hexene copolymer. Thus, the yield stress of the blend of synthetic cis-1,4-polyisoprene (Natsyn 200) and butene/hexene copolymer was significantly higher than that of the Natsyn control, even after milling for 10 minutes. Likewise, the stress-at-break was higher for the blend than for the control.

Similarly, the blends, whether milled or not, of emulsion SBR, 1,2-PBd, and natural rubber with the butene/hexene copolymer, show higher yield stress and stress-at-break values than the corresponding rubbers without the addition of the butene/hexene copolymer.

TABLE II

Effect of Blend Composition on Green Strength. Blends shown are for Natsyn 200 with 5 and 10 phr of an 85/15 1-Butene/1-Hexene Copolymer[1] in BLACK-LOADED BANBURY STOCKS.

| Extended Milling Time (Min.) | 5 PHR BLEND | | | | 10 PHR BLEND | | | |
|---|---|---|---|---|---|---|---|---|
| | Yield Stress (psi) | Break Stress (psi) | (% Elong) | Mooney (ML-4)[2] | Yield Stress (psi) | Break Stress (psi) | (% Elong) | Mooney (ML-4)[2] |
| 0 | 48 | 179 | (1250) | 77 | 57 | 270 | (1050) | 75 |

TABLE II-continued

Effect of Blend Composition on Green Strength. Blends shown are for Natsyn 200 with 5 and 10 phr of an 85/15 1-Butene/1-Hexene Copolymer[1] in BLACK-LOADED BANBURY STOCKS.

| Extended Milling Time (Min.) | 5 PHR BLEND Yield Stress (psi) | Break Stress (psi) | Break (% Elong) | Mooney (ML-4)[2] | 10 PHR BLEND Yield Stress (psi) | Break Stress (psi) | Break (% Elong) | Mooney (ML-4)[2] |
|---|---|---|---|---|---|---|---|---|
| 5 | 34 | 67 | (1600) | 59 | 45 | 62 | (800) | 53 |
| 10 | 32 | 45 | (1500) | 54 | 37 | 60 | (1200) | 49 |
| 20 | 29 | 26 | (1950) | 47 | 31 | 41 | (1700) | 44 |

[1]Molar charge composition; polymerization temperature: 30° C., inherent viscosity, 2.9; melting temperature of 80° C.; and, glass transition temperature of −35° C. (Differential thermal analyzer).
[2]Standard Mooney Viscosity Test, ASTM D 297-72. Measurements at 212° F. using a large rotor.

Table II shows addition of both 5 and 10 parts per hundred parts of the elastomer of the 85/15 butene/hexene copolymer resulted in improved green strength as compared with Natsyn control values in Table I.

TABLE III

Effect of Copolymer Composition on Green Strength of Blends with Natsyn 200. Blends with 5 phr Copolymer, Black-Loaded Banbury Stocks.

| Milling Time (min.) | Polybutene[1] Yield Stress (psi) | Break Stress (psi) | Break (% Elong) | 95/5/1-Butene/1-Hexene[2] Yield Stress (psi) | Break Stress (psi) | Break (% Elong) |
|---|---|---|---|---|---|---|
| 0 | — | 233 | (500) | 130 | 265 | (660) |
| 5 | 90 | 79 | (1,200) | 35 | 54 | (1,400) |
| 10 | 65 | 21 | (1,200) | 32 | 31 | (1,940) |
| 20 | 42 | 12 | (1,900) | 27 | 11 | (2,040) |

| Milling Time (min.) | 90/10/1-Butene/1-Hexane[3] Yield Stress (psi) | Break Stress (psi) | Break (% Elong) | 85/15/1-Butene/1-Hexene[4] Yield Stress (psi) | Break Stress (psi) | Break (% Elong) |
|---|---|---|---|---|---|---|
| 0 | 165 | 267 | (460) | 48 | 179 | (1,250) |
| 5 | 70 | 96 | (630) | 34 | 67 | (1,600) |
| 10 | 30 | 26 | (2,500) | 32 | 45 | (1,500) |
| 20 | 28 | 20 | (2,000) | 29 | 26 | (1,950) |

| | ENDOTHERMIC PEAK, °C. | Inherent Viscosity, dl./g. |
|---|---|---|
| 1 | 72, 96, 118 | — |
| 2 | 81, 104 | 5.1 |
| 3 | 95 (estimated) | 4.7 |
| 4 | 80 | 2.9 |

| Milling Time (min.) | 80/20 1-Butene/1-Hexene[5] Yield Stress (psi) | Break Stress (psi) | Break (% Elong) | 70/30 1-Butene/1-Hexene[6] Yield Stress (psi) | Break Stress (psi) | Break (% Elong) |
|---|---|---|---|---|---|---|
| 0 | 45 | 139 | (1,200) | 40 | 111 | (950) |
| 5 | 34 | 52 | (1,700) | 31 | 43 | (1,120) |
| 10 | 30 | 36 | (1,750) | 29 | 31 | (1,580) |
| 20 | 29 | 22 | (2,070) | 30 | 28 | (1,610) |

| Milling Time (min.) | 90/10 1-Butene/1-Octene[7] Yield Stress (psi) | Break Stress (psi) | Break (% Elong) | 95/5/5 1-Butene/1-Octene/1,7-Octadiene[8] Yield Stress (psi) | Break Stress (psi) | Break (% Elong) |
|---|---|---|---|---|---|---|
| 0 | 43 | 154 | (940) | 65 | 147 | (700) |
| 5 | 32 | 49 | (1,530) | 32 | 43 | (1,120) |
| 10 | 29 | 34 | (1,830) | 31 | 34 | (1,840) |
| 20 | 26 | 14 | (1,820) | 29 | 20 | (1,740) |

| | ENDOTHERMIC PEAK, °C. | INHERENT VISCOSITY, dl./g. |
|---|---|---|
| 5 | 53, 74 | 0.5 (number average molecular weight |
| 6 | — | 3.7 estimated to be 30,000) |
| 7 | 68 | 8.1 |
| 8 | 64 | — |

TABLE IV

Blends of Natsyn 200 with 5 percent 1-Butene/1-Hexene (80/20) Copolymer[1]
Compared with 5 percent 1-Butene/Propylene (80/20) Copolymer[2]
(Black-Loaded Banbury Stocks)

|  | Milling Time (min.) | 1-Butene/1-Hexene Blend[3] | | | 1-Butene/Propylene Blend | | |
|---|---|---|---|---|---|---|---|
|  |  | Yield Stress (psi) | Break Stress (psi) | (% Elong) | Yield Stress (psi) | Break Stress (psi) | (% Elong) |
| Natsyn 200 | 0 | 45 | 139 | (1200) | 80 | 155 | (500) |
|  | 5 | 34 | 52 | (1700) | 37 | 64 | (1840) |
|  | 10 | 30 | 36 | (1750) | 32 | 36 | (1980) |
|  | 20 | 29 | 22 | (2070) | 29 | 22 | (2000) |

[1]Molar charge ratio; inherent viscosity, 0.5.
[2]Molar charge ratio; polymerization temperature: 30° C.; inherent viscosity, 4.7.
[3]Data on butene/hexene copolymer (5) from TABLE III shown here for comparison with butene/propylene copolymer.

TABLE V

Effect of Addition of 5 percent 90/10 1-Butene/1-Hexene Copolymer[1]
On Green Strength of Cis-1,4-Polybutadiene and A Rubber Blend
(Black-Loaded Banbury Stocks)

|  | Milling Time (min.) | CONTROL STOCKS | | | 5% BUTENE/HEXENE BLENDS | | |
|---|---|---|---|---|---|---|---|
|  |  | Yield Stress (psi) | Break Stress (psi) | (% Elong) | Yield Stress (psi) | Break Stress (psi) | (% Elong) |
| Budene[2] | 0 | 19 | 7 | (600) | 68 | 45 | (200) |
|  | 5 | 17 | 3 | (570) | 24 | 11 | (670) |
|  | 10 | 18 | 5 | (650) | 27 | 11 | (350) |
|  | 20 | 19 | 5 | (510) | 24 | 9 | (480) |
| Rubber Blend[3] | 0 | 37 | 60 | (1810) | 57 | 99 | (790) |
|  | 5 | 32 | 30 | (1830) | 37 | 39 | (1490) |
|  | 10 | 29 | 21 | (1580) | 40 | 31 | (1370) |
|  | 20 | 28 | 17 | (1410) | 37 | 26 | (1120) |

[1]molar charge ratio; inherent viscosity, 3.1.
[2]cis-1,4-polybutadiene; commercially available from The Goodyear Tire and Rubber Company.
[3]Blend containing 35/35/30 natural rubber (#1 ribbed smoked sheet)/Budene/SBR (84% butadiene and 16% styrene extended with 37.5 parts of oil).

The data in Table III demonstrates that the homopolymer of 1-butene, 5 different copolymers of 1-butene and 1-hexene of varying compositions and having significantly different melting temperatures and viscosities, a copolymer of 1-butene and 1-octene, and a terpolymer of 1-butene, 1-hexene and 1,7-octadiene were effective in enhancing the green strength of Natsyn 200 when compared with the data in Table I for Natsyn 200.

The data in Table IV shows that the 80/20 butene/propylene copolymer was at least as effective as the 80/20 butene/hexene copolymer in enhancing the green strength of Natsyn.

The blend of natural rubber, polybutadiene, and SBR with 5 percent of a butene/hexene copolymer, as set forth in Table V, gave improved green strengths over the control (without copolymer). Similar improvement in green strength was also observed for high cis-1,4-polybutadiene.

TABLE VI

Unvulcanized and Vulcanized Properties of Solution
Blends[1] of a 90/10 Butene/Hexene Copolymer with Natsyn 200[2]

| Natsyn 200 (parts/hundred rubber) | 100 | 97 | 95 |
|---|---|---|---|
| Butene/Hexene Copolymer (phr) | 0 | 3 | 5 |
| UNVULCANIZED PROPERTIES | | | |
| Green Tensile Strength (psi) | 21 | 44 | 178 |
| Elongation at Break (%) | 1650 | 500 | 500 |
| Compound Mooney (MS-1½)[3] | 43 | 48 | 51 |
| Raw Polymer Stability: (Mooney ML-4) | | | |
| 0 days | 87 | 75 | 75 |
| 21 days | 70 | 64 | 62 |
| % decrease | 19.5 | 14.7 | 17.3 |

[1]Hexane cements of Natsyn 200 and the copolymer were blended in solution by stirring, dried and finished by steam stripping the solvent (hexane) and dewatering the resultant crumb rubber blend.
[2]Natsyn 200 is commercially available from The Goodyear Tire and Rubber Company.
[3]Standard Mooney tests found in ASTM D297-72. Measurements at 212° F. using a small rotor.

| VULCANIZATE PROPERTIES[4] | | | |
|---|---|---|---|
| AT 77° F. | | | |
| 300% Modulus (psi) | 812 | 928 | 928 |
| Tensile Strength (psi) | 4263 | 4147 | 4002 |
| Elongation at Break (%) | 680 | 680 | 690 |
| AT 200° F. | | | |
| Tensile Strength (psi) | 2880 | 2920 | 3120 |
| Elongation at Break (%) | 680 | 630 | 670 |

[4]Stocks were compounded according to the following recipe and cured at 275° F. for 40 minutes:

|  | pm |
|---|---|
| Rubber | 100 |
| HAF black | 35 |
| Zinc Oxide | 3.0 |
| Stearic Acid | 2.0 |
| Antioxidant | 1.0 |
| Sulfur | 2.0 |
| Accelerator | 0.8 |
| TOTAL | 143.8 |

Table VI shows the results of solution blending hexane cements of the copolymer with Natsyn 200. Green Strength is improved with both 3 and 5 percent additions of copolymer and the vulcanizate properties are essentially unchanged.

Blends containing reclaim rubber were made and tested. The analysis of the reclaim rubber used as the elastomer was as follows:

| Natural rubber | 30 percent |
|---|---|
| SBR | 35 percent |
| Polybutadiene | 35 percent |
| Acetone extractables | 25 percent |
| Total Sulfur | 1.5 percent |
| Free carbon | 22 percent |
| Ash | 12 percent |

The recipe and blending conditions of the reclaimed rubber were as follows:

| MATERIAL | PHR | BLENDING CONDITIONS |
|---|---|---|
| Reclaim | 200 | Brabender mixed, |
| Copolymer[1] | 50 | 5½ minutes @50 RPM |
| zinc oxide | 5 | 225° F. oil circulating |
| stearic acid | 2 | reservoir temperature |

[1] 95:5 butene/hexene copolymer (See TABLE III).

The reclaim rubber-butene copolymer blend was then tested and the data is shown in Table VII.

TABLE VII

| COMPOSITION | YIELD STRESS (psi) | BREAK (STRESS) (psi) | (% Elongation) |
|---|---|---|---|
| Reclaim control (without copolymer) | 45 | 45 | (240) |
| Reclaim rubber/copolymer blend | 97 | 97 | (190) |

Thus, as is readily apparent from Table VII, the addition of a butene/hexene copolymer to reclaim rubber improved its yield stress and stress-at-break by at least 100 percent.

As is apparent to those skilled in the art, many modifications of the invention can be made without departing from the spirit of the invention disclosed and described herein. The scope of this invention is being measured solely by the appended claims.

What is claimed is:

1. A process for producing elastomer blends having improved green strength, comprising, mixing a semi-crystalline butene polymer having a number average molecular weight of from about 30,000 to about 500,000 with an elastomer to produce the blend, the amount of said butene polymer ranging from about 2 to about 25 parts per 100 parts by weight of said elastomer, said butene polymer selected from the group consisting of polybutene and interpolymers made from 1-butene monomer and at least one monomer selected from the group consisting of alphaolefins having 2 through 16 carbon atoms; non-conjugated dienes having the general formula:

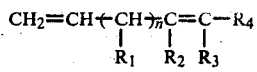

where $R_1$, $R_2$, and $R_3$ is a hydrogen, a lower alkyl group containing from one to four carbon atoms, or an aryl group; where $R_4$ is an aryl group or a lower alkyl group containing from one to nine carbon atoms, and n is an integer having a value of from 1 to 6, and wherein the said $R_1$'s in the

group may be similar or dissimilar; and non-conjugated alpha, omega-polyenes having from 6 to 36 carbon atoms which may or may not contain internal unsaturation, wherein butene in said interpolymers comprises from 99.9 to 65 mole percent of the total monomers, and said elastomer being reclaimed rubber.

2. An elastomer blend compostition having improved green strength, comprising:

a blend of a semi-crystalline butene polymer having a number average molecular weight of from about 30,000 to about 500,000 with an elastomer, the amount of said butene polymer ranging from about 2 to about 25 parts per 100 parts by weight of said elastomer, said butene polymer selected from the group consisting of polybutene and interpolymers made from 1-butene monomer and at least one monomer selected from the group consisting of alpha-olefins having 2 through 16 carbon atoms, non-conjugated dienes having the general formula:

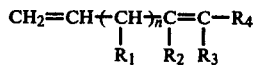

where $R_1$, $R_2$ and $R_3$ is a hydrogen, a lower alkyl group containing from one to four carbon atoms, or an aryl group; where $R_4$ may be an aryl group or a lower alkyl group containing from one to nine carbon atoms, and n is an integer having a value of from 1 to 6, and wherein the said $R_1$'s in the

may be similar or dissimilar; and non-conjugated alpha, omega-polyenes having from 6 to 36 carbon atoms which may or may not contain internal unsaturation, wherein butene in said interpolymers comprises from 99.9 to 65 mole percent of the total monomers, and said elastomer being reclaimed rubber.

* * * * *